No. 703,101. Patented June 24, 1902.
W. F. WARE.
MEDICINE DROPPER.
(Application filed June 8, 1901.)
(No Model.)
Fig. 1.
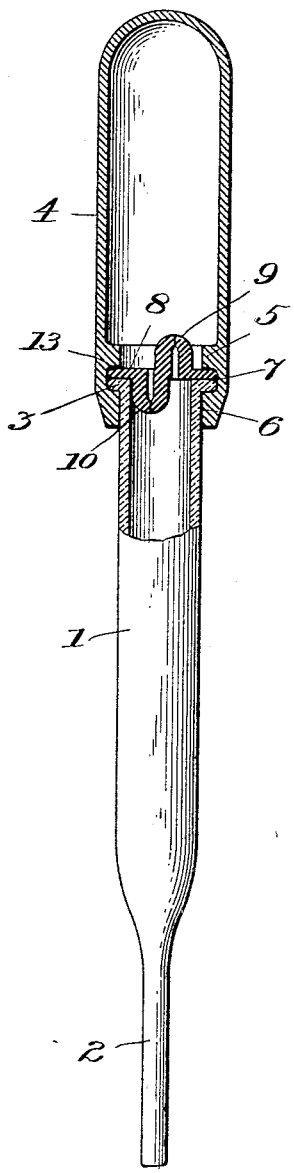
Fig. 2.
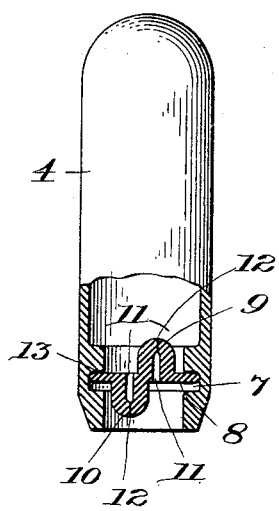
Fig. 4.
Fig. 3.
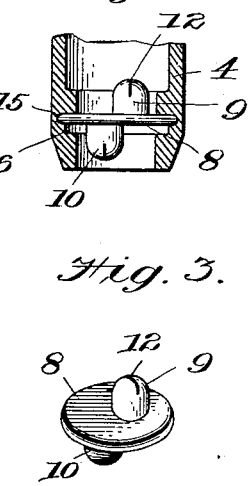
Witnesses,
Jno. T. Cross.
Chas. T. Bennett.
Inventor,
Walter F. Ware,
by Horace Pettit
his Attorney.
THE NORRIS PETERS CO., PHOTO-LITHO., WASHINGTON, D. C.

UNITED STATES PATENT OFFICE.

WALTER F. WARE, OF CAMDEN, NEW JERSEY.

MEDICINE-DROPPER.

SPECIFICATION forming part of Letters Patent No. 703,101, dated June 24, 1902.

Application filed June 8, 1901. Serial No. 63,719. (No model.)

*To all whom it may concern:*

Be it known that I, WALTER F. WARE, a citizen of the United States, and a resident of Camden, State of New Jersey, have invented certain new and useful Improvements in Medicine-Droppers, of which the following is a full, clear, and exact description, reference being had to the accompanying drawings, forming part of this specification.

My invention relates to certain improvements in droppers and eye-pipettes; and it consists in the construction as hereinafter set forth.

The principal object of this invention is to provide a device of this character having the valves secured or supported in the nipple or compression-cap. This construction is especially advantageous in manufacturing and assembling the parts, as the nipple and valve-disk are made of rubber and can be easily assembled by the rubber manufacturer, while the stem or barrel is obtained from a glass factory and can be readily inserted in the nipple by unskilled persons, and consequently at a very small cost. Another advantage is that should the glass barrel be broken it can be easily removed from the nipple and a new one inserted without having to remove or disturb the valve-disk.

In the accompanying drawings, Figure 1 represents a side elevation of the complete device, the nipple, valve-disk, and upper portion of the glass barrel being shown in section. Fig. 2 is a sectional elevation of the nipple, showing the valve-seat and valves in position. Fig. 3 is a detail perspective of the valve-disk. Fig. 4 is a detail section illustrating a slight modification in the valve-seat.

In carrying out my invention I provide a tubular barrel 1, preferably composed of glass, having a tapering or reduced lower end 2, which in this instance is shown as being straight, but which might have a curved end if it should be desired. The upper end of the barrel 1 is provided with an exterior flange 3, as illustrated in Fig. 1 of the drawings, and is adapted to be inserted into the lower open end of the nipple or compression-bulb 4.

The nipple 4 is made of flexible rubber, having its upper end closed and its lower end open, and is preferably of the shape illustrated in the drawings. On the interior of the nipple 4, adjacent to its open end, I provide an annular rib or flange 5, and below this flange 5 is a second flange or thickened wall 6, which extends to the open end of the nipple, the two flanges forming an annular recess or groove 7 between their opposing edges.

A flat circular disk 8 is provided, which is of a diameter about equal to the interior diameter of the nipple between the two flanges. The disk 8 is provided with two small nipples, as 9 and 10, one extending from each of its faces and each being provided with a vertically-disposed orifice 11, which enters the said nipples from opposite sides of the disk. The orifices terminate within a short distance of the end of each nipple, and a slit 12 is cut in the closed end of each of said nipples of a depth sufficient to communicate with the orifices 11, thus forming two valves opening in opposite directions.

The disk 8 is preferably made of rubber, and in assembling the parts the said disk is forced into the nipple 4 until its peripheral edges enter the annular groove 7, provided on the interior of the said nipple 4. The upper edge of the disk 8 is preferably provided with a coating of cement, as at 13, so that when it is inserted in position in the groove 7 it will adhere to the lower edge of the flange 5 and become practically integral with the rubber nipple 4. The upper end of the barrel 1, having the flange 3 provided thereon, is then inserted into the open end of the nipple, and its flange 3 is forced into the groove 7 directly under the disk 8, and thus securely held in position. When the parts are thus assembled, the valve-disk 8 would be securely held in its position in the groove 7 without the use of the cement before described; but it is preferable to use this cement, as it will retain the valve-disk in position and prevent its displacement should the barrel 1 be removed from the nipple. It will thus be seen that should the barrel 1 be broken it can be easily and quickly removed from the nipple and a new barrel inserted in its place without displacing or disturbing the valve-disk 8.

In Fig. 4 I have illustrated a slightly-modified form of my invention, wherein the groove provided on the interior of the nipple 4 is provided with a shoulder, so as to form practically a double groove, the upper portion 15 having a greater depth than the lower portion 16. In this construction when placing the disk 8 in position it will be forced into the upper portion 15 of the groove and securely held therein, the shoulder holding it to its position without any danger of displacement should the cement fail to properly adhere to the upper wall of the groove. This is advantageous when the nipples are sold independent of the glass barrel, as it is then necessary that the valve-disk should be securely located in its proper position.

In operation when the nipple or bulb 4 is compressed the air will be expelled from the interior of said nipple through the valve-opening in nipple 10 into the barrel 1, which expels a portion of the air from the said barrel. The point 2 of the barrel is then inserted into the liquid to be used, and the nipple or bulb 4 is allowed to expand, which draws a portion of the air from the barrel 1 back into the nipple 4 though the medium of the valve-opening provided in nipple 9, thus causing a partial vacuum in the barrel 1, which is relieved by a portion of the liquid being drawn up into it. The dropping of the liquid is then performed by slightly compressing the nipple or bulb 4 in the usual manner.

This invention is designed as an improvement over United States Letters Patent No. 424,632, granted to me April 1, 1890, and I do not desire to claim the two-way valve broadly, but only as an element in the combined construction, as fully set forth herein, and as particularly pointed out in the claims made hereto.

Having thus described my invention, what I claim, and desire to secure by Letters Patent, is—

1. The combination of a compressible nipple open at one end, an annular groove or recess formed on the interior of said nipple adjacent its open end, a valve-disk having flanges adapted to be seated in said annular recess, valves upon said disk and a tubular barrel having an annular flange on its upper end clamped snugly in the annular recess of the nipple against the lower margin of the valve-disk, substantially as described.

2. The combination of a compressible nipple, open at its lower end, a pair of annular ribs or flanges formed on the interior of said nipple adjacent its open end forming a recess between them, a valve-disk provided with two valves each opening in opposite directions, the margin of said disk being seated against the upper wall of the recess, and a tubular barrel having an annular flange on its upper end clamped in the recess below the valve-disk against said disk, substantially as described.

3. The combination of a compressible nipple, open at its lower end, a pair of annular ribs or flanges formed on the interior of said nipple adjacent its open end forming a recess between them, a valve-disk provided with two valves each opening in opposite directions, the upper margin of said disk being seated against the upper wall of the recess and cemented thereto so as to become practically integral with the nipple, and a tubular barrel having an annular flange on its upper end adapted to be forced in the recess below the valve-seat said flange abutting the lower margin of the disk, substantially as described.

4. A compressible nipple or bulb for medicine-droppers, comprising a hollow bulb open at its lower end, an interior groove formed in said bulb adjacent its open end, a valve-disk having valves opening in opposite directions, the edges of said disk seated in the upper portion of the groove, and means for securing the said valve-disk in the groove, substantially as described.

In witness whereof I have hereunto set my hand this 6th day of June, A. D. 1901.

WALTER F. WARE.

Witnesses:
ARTHUR E. NITZSCHE,
JNO. T. CROSS.